May 12, 1964
L. G. BOUGHNER
3,132,531
ELECTRICAL GEAR SHIFT MECHANISM
Filed Feb. 2, 1960
6 Sheets-Sheet 1
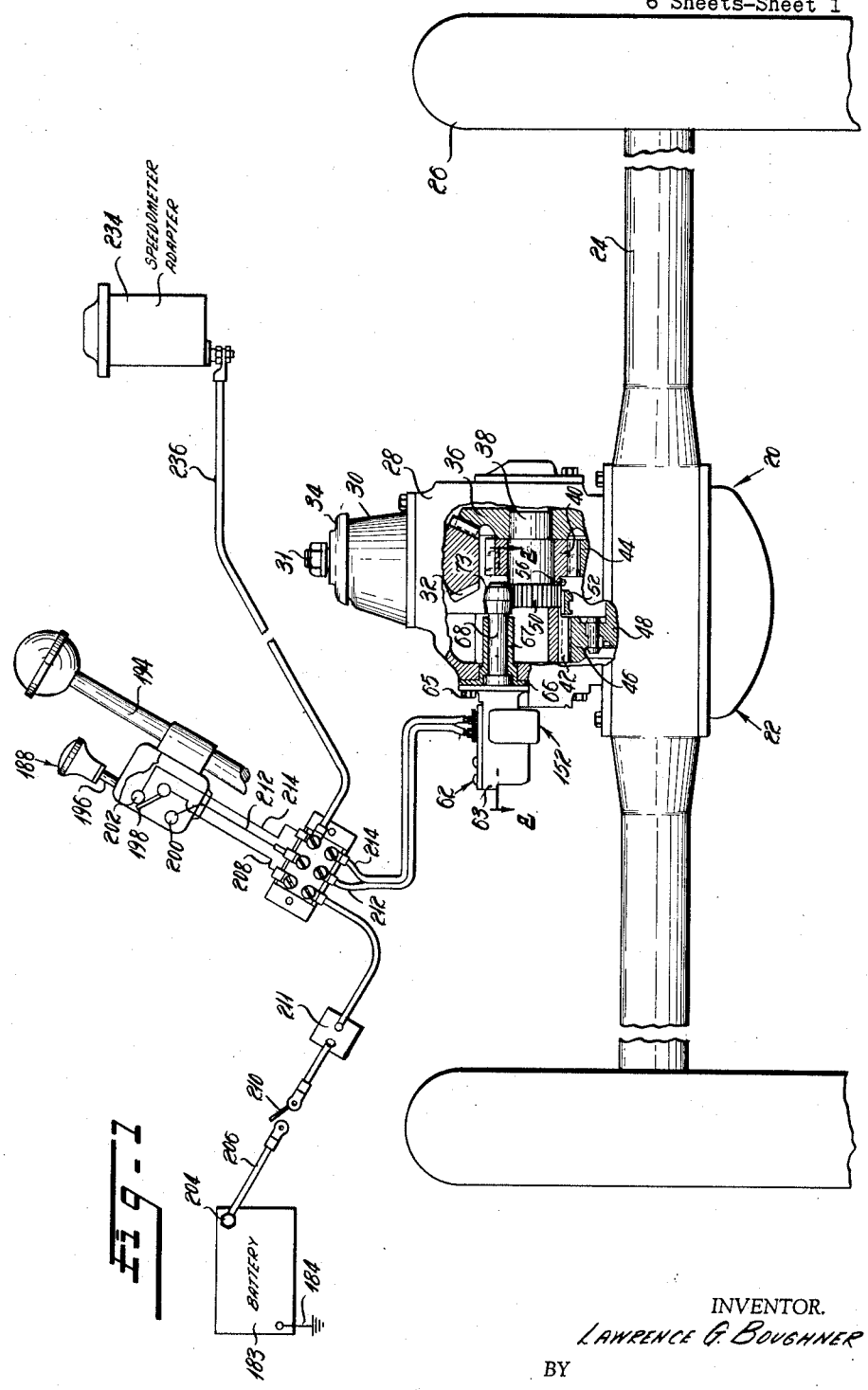
INVENTOR.
LAWRENCE G. BOUGHNER
BY
Strauch, Nolan & Neale
ATTORNEYS May 12, 1964     L. G. BOUGHNER     3,132,531
ELECTRICAL GEAR SHIFT MECHANISM
Filed Feb. 2, 1960                               6 Sheets-Sheet 2
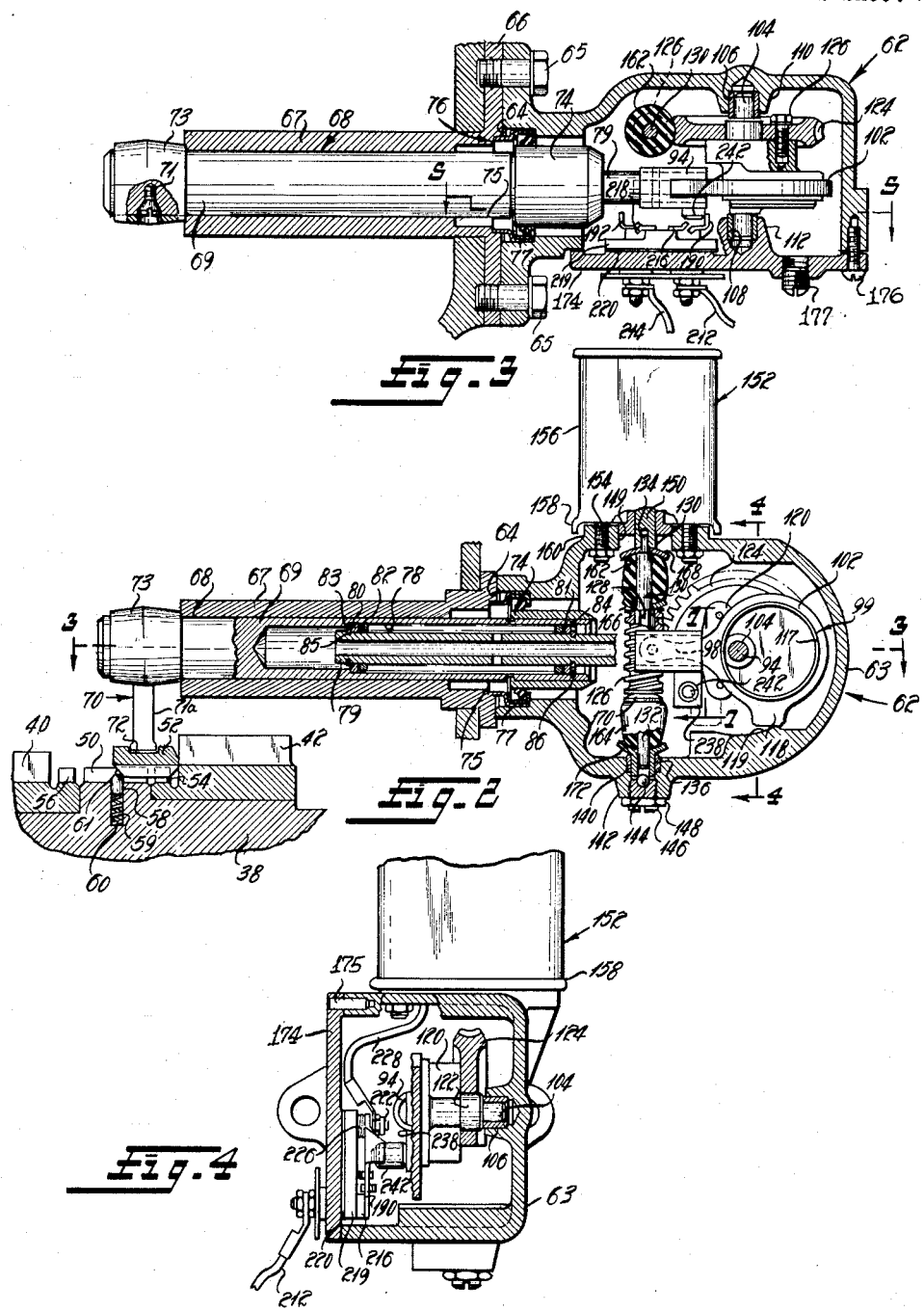
INVENTOR.
LAWRENCE G. BOUGHNER
BY
ATTORNEYS May 12, 1964 L. G. BOUGHNER 3,132,531
ELECTRICAL GEAR SHIFT MECHANISM
Filed Feb. 2, 1960 6 Sheets-Sheet 3
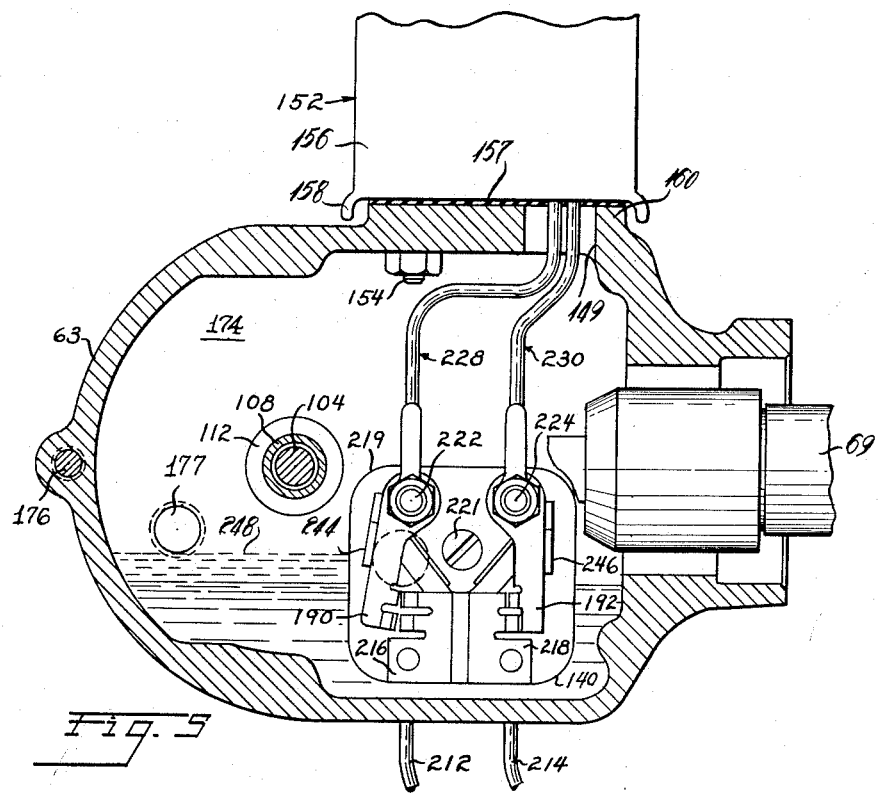
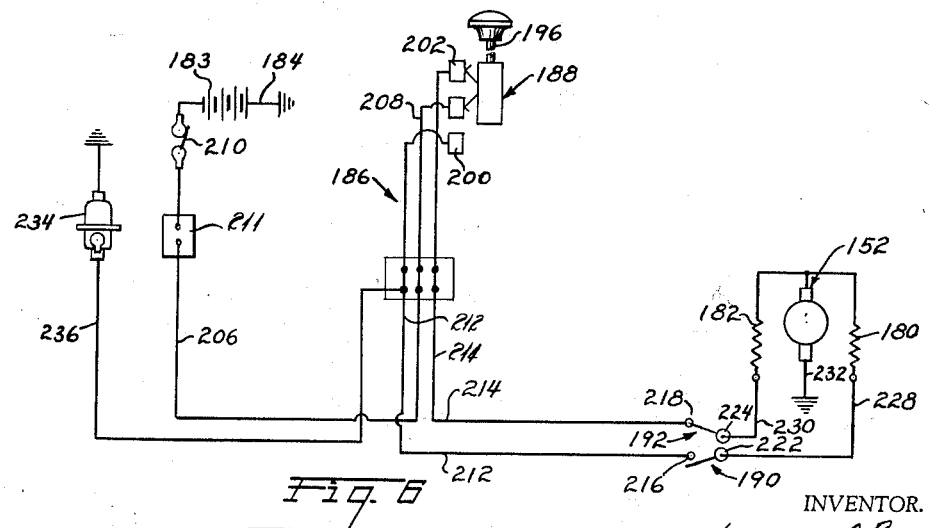
INVENTOR.
LAWRENCE G. BOUGHNER
BY
Strauch, Nolan & Neale
ATTORNEYS May 12, 1964

L. G. BOUGHNER 3,132,531

ELECTRICAL GEAR SHIFT MECHANISM

Filed Feb. 2, 1960

INVENTOR.
LAWRENCE G. BOUGHNER
BY
Staunch, Nolan & Neale
ATTORNEYS

May 12, 1964  L. G. BOUGHNER  3,132,531
ELECTRICAL GEAR SHIFT MECHANISM
Filed Feb. 2, 1960  6 Sheets-Sheet 5
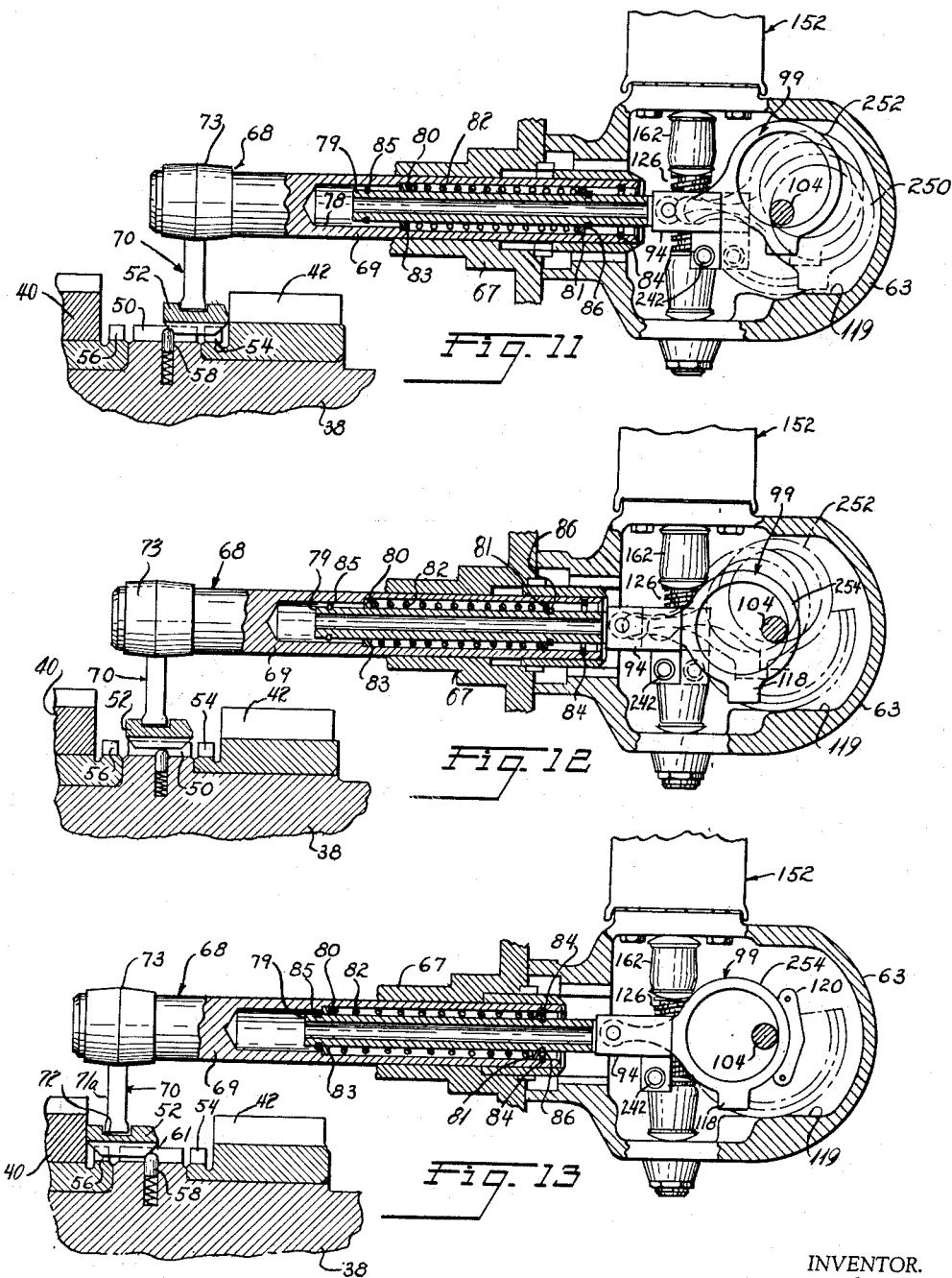
INVENTOR.
LAWRENCE G. BOUGHNER
BY
ATTORNEYS May 12, 1964 L. G. BOUGHNER 3,132,531
ELECTRICAL GEAR SHIFT MECHANISM
Filed Feb. 2, 1960 6 Sheets-Sheet 6

INVENTOR
LAWRENCE G. BOUGHNER

BY Strauch, Nolan & Neale
ATTORNEYS

United States Patent Office 3,132,531
Patented May 12, 1964

3,132,531
ELECTRICAL GEAR SHIFT MECHANISM
Lawrence G. Boughner, Birmingham, Mich., assignor to Rockwell-Standard Corporation, Coraopolis, Pa., a corporation of Pennsylvania
Filed Feb. 2, 1960, Ser. No. 6,295
24 Claims. (Cl. 74—335)

The present invention relates to gear shifting mechanisms and more particularly to electrically controlled gear shifting mechanisms for use in motor vehicle multi-speed drive axles to perform axle gear shifting operations without de-clutching or disconnecting the train of drive mechanism from the source of power.

In the operation of motor vehicles and particularly heavy duty type vehicles, it has become customary in recent years to provide the vehicle drive axles with different drive gear ratios in addition to the drive gear ratios provided in the conventional change-speed transmission so as to selectively increase or decrease the driving speed of the axle independently of the gear ratios selected in the transmission unit. By this construction a greater number of axle driving speeds are available to obtain maximum speed combined with increased pulling power under varying traffic and road conditions to thereby provide for a more economical consumption of fuel.

Such multi or two-speed drive axle assemblies are generally constructed so as to include an automatically or manually operated positive-type clutch unit for selectively engaging separate change speed gears with the axle differential mechanism to provide for slow and fast gear speed ratio drive connections to the axle differential input. As usually constructed, the positive-type clutch unit has a shiftable clutch element or slidable clutch collar provided with internal teeth and movable between two driving gears. The clutch collar is selectively meshed with either one of the driving gears to complete a drive connection between the engine transmission output and the multi-speed axle differential input.

In order to disengage the shiftable clutch element or clutch collar from the gear with which it is meshed under a torque load, an application of a relatively large force is required to overcome the frictional resistance developed between the teeth of the clutch element and the meshing gear by the transmission of torque. Continued application of the same magnitude of disengaging force for establishing engagement of the clutch element with the other driving gear, however, has been found to cause the clutch element teeth to jam or clash with the drive gear teeth thereby resulting in damage of the component parts or in failure to complete the shifting operation from one driving gear to the other.

In order to overcome this unfavorable condition, the present invention contemplates the provision of an energy storing device operatively incorporated into the shifting mechanism and loaded by the force applied in disengaging the clutch element so as to release a predetermined magnitude of energy stored therein to complete the shifting operation with a reduced magnitude of force that will not cause the teeth of the shiftable clutch element to jam or clash with the driving gear. By this structure, rapid and effective shifting between high and low speeds is accomplished without de-clutching or disconnecting the drive train connecting the vehicle engine output to the multi-speed axle differential input.

In order to operate the shifting mechanism and to provide for the power required to disengage the shiftable clutch element from the gear with which it is meshed and to concomitantly preload the energy storing device, a reversibly operable electric motor may be employed. In some presently available speed changing mechanisms embodying such a motor, difficulties have been encountered in that after the electrical current is interrupted, the motor shaft continues to rotate by virtue of the inertia of the moving motor parts. Thus, the motor continues to apply torque to move the shiftable clutch element after the current is interrupted to cause the clutch element to overtravel its position for engaging the selected driving gear. This condition promotes ineffective shifting operations and often results in a failure to establish a drive connection with the driving gear.

A further difficulty encountered in some presently used automatic shifting mechanisms of this type is that in certain relative positions of the component parts of the shifting mechanism, the shiftable clutch element or clutch collar will be shifted from one gear engaging position to the other in one continuous motion without an intermediate stop or pause to establish synchronization with the driving gear selected to be engaged. When this through-shift occurs, the initial relatively large force applied for disengaging the shiftable clutch element is not reduced and is imparted to establish engagement of the clutch element with the selected driving gear. This condition causes the clutch element to either jam with the driving gear or to rebound out of engagement with the gear with a resulting incompletion of the shifting operation.

The present invention generally contemplates an electric gear shift mechanism for a two-speed drive axle basically consisting of a shiftable clutch collar mounted for axial movement and actuatable by a special telescoping shift rail unit to selectively mesh with a high speed drive axle gear and a low speed drive axle gear. The clutch collar shift rail unit embodies a special energy storage device which receives power from a reversibly operable electric motor for moving the clutch collar. Drivingly interconnecting the motor output shaft with the shift rail unit is a special motion converter mechanism for translating the rotary motion of the motor shaft into linear motion for preloading the energy storage device and moving the shift rail unit. The telescoping shift rail unit functions to first permit the storage of energy in the energy storage device without movement of the clutch collar, and then permits the direct application of torque by the motor for disengaging the clutch collar. The shifting operation is completed by the automatic release of energy stored by the storage device to move the clutch collar into engagement with the selected drive gear with a reduced magnitude of force that is appreciably less than the force applied for initially disengaging the clutch collar.

The present invention particlarly contemplates and has as its purpose a rugged and efficiently organized, compact, mechanically simple, easily assembled electric shift mechanism to facilitate smooth, rapid and effective gear shifting operations in a multi-speed drive axle without de-clutching or disconnecting the train of drive mechanism from the vehicle engine. The invention further contemplates an electrical gear shift mechanism having a reversibly operable electric motor for actuating a movable clutch element wherein positive stops are provided to prevent additional movement of the clutch element by rotation of the electric motor after the electric current energizing the motor is interrupted thereby preventing the clutch element from overtraveling its positions of engagement with the driving gears and wherein the shock of engagement of the shiftable clutch element with either of the driving gears is cushioned to prevent the component parts of the mechanism from being jarred and to prevent the clutch element from rebounding out of engagement with a selected driving gear. The invention further contemplates a special motion converter mechanism having gear components drivingly interconnecting the motor shaft with the shiftable clutch element for converting rotatable motion of the machine shaft into reciprocable motion especially constructed to assure free movement of the gear components and to prevent the gear components from jamming when excessive strains are applied thereto.

Accordingly, the present invention has as its major object the provision of a novel electric gear shift mechanism that is compact and mechanically simple for facilitating rapid and effective gear shifting operations in a multi-speed drive axle without de-clutching or disconnecting the train of drive mechanism from the vehicle engine output.

A further object of the present invention is to provide in an electric gear shift mechanism having a reversibly operable electric motor and a shiftable gear ratio selecting clutch element actuated thereby, a novel motion converter mechanism drivingly interconnecting the shaft of the motor with the clutch element for translating the rotary motion of the shaft into linear motion for reciprocably moving the shiftable clutch element to assure free movement of the component parts of the shift mechanism and to prevent the gear components of the shift mechanism from jamming when excessive strains are applied thereto.

Another object of the present invention is to provide a novel electric gear shift mechanism having a reversibly operable motor and automatically operated switches for interrupting the electrical energizing circuit to the motor at predetermined positions of the shift mechanism.

A further object of the present invention resides in the provision of a gear shift mechanism as in the preceding object wherein the automatically operated switches are located in a housing enclosing the power transmitting components of the shift mechanism and are immersed in oil to prevent coking of the contact surfaces.

Still a further object of the present invention resides in the provision of a gear shift mechanism as in the preceding object wherein the switches are insulatingly mounted on the cover plate of the housing thereby being readily accessible for service.

Another object of the present invention is to provide a novel electric gear shift mechanism having a shiftable gear ratio selecting member, a reversibly operable electric motor and power transmitting means drivingly interconnecting the motor with the selecting member wherein cooperating stop abutment surfaces are provided to prevent rotation of the drivingly interconnecting power transmitting means beyond 180° in either direction.

Further objects will become apparent as the following description is read in conjunction with the appended claims and accompanying drawings wherein:

FIGURE 1 is a diagrammatic view showing an electric gear shift unit according to a preferred embodiment of the present invention and illustrating the component parts of the mechanism associated with a multi-speed drive axle;

FIGURE 2 is a section along line 2—2 of FIGURE 1 illustrating the electric gear shift mechanism;

FIGURE 3 is a view partially in section along line 3—3 of FIGURE 2;

FIGURE 4 is a section along line 4—4 of FIGURE 2;

FIGURE 5 is a section along line 5—5 of FIGURE 3;

FIGURE 6 is an electrical schematic view illustrating the electrical circuit for operating the electric gear shift mechanism of FIGURE 1;

FIGURE 11 is a view similar to FIGURE 2 and illustrating the movement in dotted lines of the component parts of the electric gear shift mechanism for preloading the energy storing device from a high speed position;

FIGURE 12 is a view similar to FIGURE 11 and showing the sequential movement in dotted lines of the component parts of the electric gear shift mechanism disengaging the shiftable clutch element from the high ratio gear after the energy storage device is preloaded;

FIGURE 13 is a view similar to FIGURE 11 showing the position of the component parts of the mechanism when the shiftable clutch element is in engagement with the low ratio gear;

Figure 7:
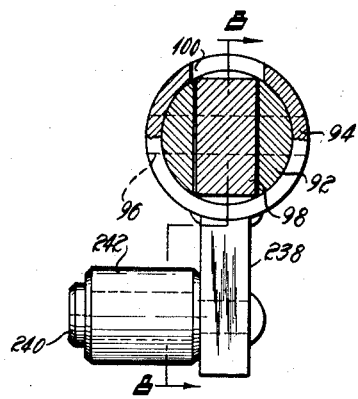
FIGURE 7 is a section along line 7—7 of FIGURE 2.

Referring now to the drawings and more particularly to FIGURE 1, wherein the construction embodying the principles of the present invention is shown, a two-speed vehicle drive axle assembly generally designated at 20 is illustrated and comprises a drive axle unit 22 having an axle housing 24 supported at its opposite ends by ground-engaging wheels 26 which are differentially driven by conventional axle shafts (not shown) extending through the axle housing. Axle unit 22 is provided with a differential gear carrier 28 having a forward nose or bearing cage section 30. Rotatably mounted in cage section 30 is a power input bevel or hypoid pinion gear 32 rigid with a pinion shaft 31 extending beyond the carrier 28 and adapted to be drivingly connected to the power output of a vehicle transmission unit (not shown) by a suitable universally connected propeller shaft (not shown). A seal 34 mounted in surrounding relationship to shaft 31 prevents contaminating foreign matter from entering bearing cage 30.

A ring gear 36 in constant mesh with pinion 32 is secured upon a cross shaft 38 rotatably mounted at its opposite ends in the carrier 28. Adjacent ring gear 36, a high ratio low speed gear 40 is journalled for rotation on cross shaft 38 and is restrained thereon from axial movement. Axially spaced from high ratio gear 40 adjacent the left-hand end of cross shaft 38 a low ratio high speed gear 42 is journalled for rotation on shaft 38 and restrained thereon from axial movement. Gears 40 and 42 respectively are in constant mesh with differential ring gears 44 and 46 fixedly secured to a cylindrical differential case 48 of a conventional differential gear drive mechanism differentially drive connected to the differential driven axle (not shown) located in axle housing 24. Differential case 48 is conventionally mounted for rotation in carrier 28 so as to be rotated either by gear 44 or gear 46.

Between gears 40 and 42, the cross shaft 38 is formed with an enlarged externally splined portion 50 against which the inner ends of gears 40 and 42 axially abut. An internally splined clutch collar 52 is mounted for longitudinal sliding movement along the splined portion 50 of shaft 38 so that the collar 52 rotates with shaft 38 as a unit. As best shown in FIGURE 2, gears 40 and 42 are each provided with an axially extending hub portion adjacent shaft portion 50, providing exterior annular rows of clutch teeth 54 and 56 which are adapted for mating driving engagement with the internal splines of clutch collar 52.

By this construction, it will be appreciated that clutch collar 52 is shiftable to drivingly connect either high ratio gear 40 or low ratio gear 42 to cross shaft 38 so as to facilitate rotation of differential case 48 either by the low ratio gear 42 or the high ratio gear 40.

As best shown in FIGURE 2, a plurality of detents 58 are radially movable in bores 59 formed in the enlarged shaft splined portion 50 and are urged outwardly by springs 60. The outer ends of detents 58 are smoothly curved and cooperate with the inclined end faces 61 of the internal splines of clutch collar 52 to provide a camming action for a purpose as will hereinafter become apparent.

With reference now to FIGURES 1–3 and 14, the actuating unit for clutch collar 52 is generally designated at 62 and comprises a housing 63 having a flanged opening 64 aligning with a suitable opening in carrier 28 above cross shaft 38 as viewed from FIGURE 1. Housing 63 is fixedly secured to carrier 28 as by cap screws 65 (FIGURE 1) and secured coaxially with opening 64 between housing 63 and carrier 28 is the radially extending flanged end 66 of a supporting sleeve member 67. Support sleeve member 67 projects axially into carrier 28 and receives a power storage telescoping shift rail unit 68. The outer cylindrical shift rail member 69 of unit 68 is slidably supported in sleeve 67 for reciprocating motion and extends beyond sleeve 67 at both ends.

A clutch fork 70 is rigidly fixed to the inner end of shift rail 69 as by screw 71 (FIGURE 3) and has a depending arm 71a loosely seated in an annularly formed groove 72 in collar 52 so that collar 52 may be shifted axially by reciprocable motion of shift rail 69 as best shown in FIGURE 2. The collar portion 73 of fork 70 surrounding shift rail 69 is appreciably larger than the internal diameter of sleeve 67 to thereby limit movement of the shift rail to the right as viewed from FIGURE 2. The outer end of shift rail 69 extends through flanged opening 64 in housing 63 and has integrally secured thereto (as by copper brazing) a sleeve 74. A retainer 75 of a protective seal assembly 76 is press fitted into opening 64 and an oil seal 77 which is retained thereby is in annular sealing contact with sleeve 74 so as to prevent contamination of the component parts enclosed within housing 63 and to prevent loss of lubricant therefrom.

Figure 14:
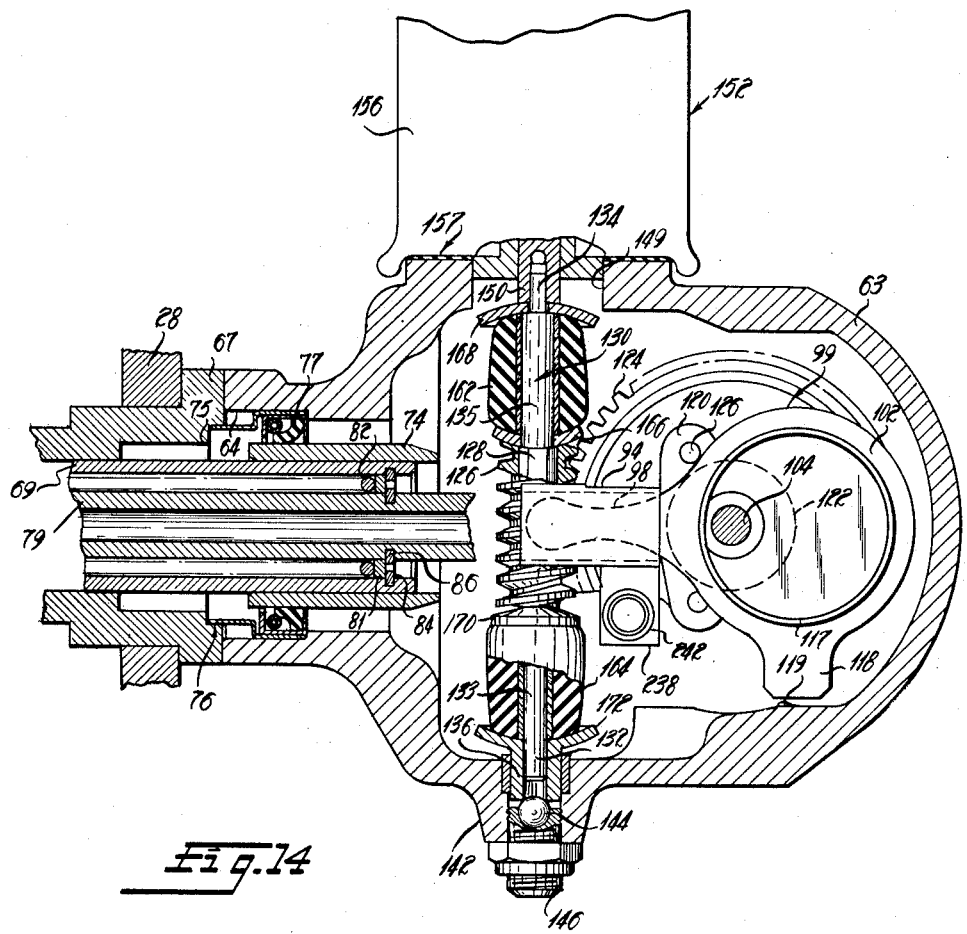
FIGURE 14 is an enlarged view of the electric gear shift mechanism of FIGURE 2.

Referring now to FIGURES 2, 3 and 14, shift rail 69 is formed with an axial stepped bore 78 extending inwardly from the outer end face thereof. A tubular push rod 79 of appreciably smaller diameter than bore 78 is freely received in the bore and is concentrically spaced from the walls of bore 78 by slidably mounted stop collars 80 and 81 adjacent its opposite ends. Mounted between stop collars 80 and 81 in the annular space between push rod 79 and shift rail 69 is a coil spring 82 axially abutting the collars 80 and 81. As shown in FIGURE 2, the shift rail unit 68 is shown in its outward position with clutch collar 52 engaging low ratio gear 42. In this position, spring 82 biases stop collar 80 into abutment with annular shoulder 83 formed in stepped bore 78 and stop collar 81 into abutment with retainer ring 84 seated in an annular groove formed in shift rail 69. Retainer rings 85 and 86 positioned in annular grooves formed in push rod 79 adjacent its inner and outer ends respectively axially abut stop collars 80 and 81 on their opposed outwardly facing sides opposite from spring 82.

Figure 8:
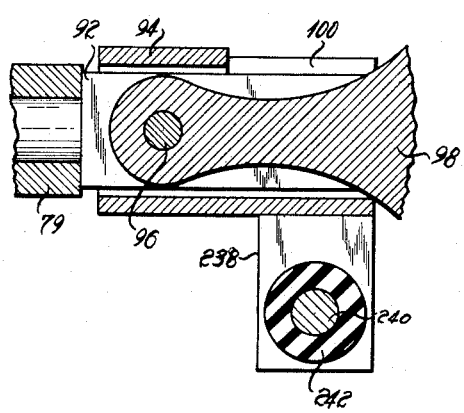
FIGURE 8 is a section along line 8—8 of FIGURE 7.

In order to axially move shift rail 69 in either direction and preload spring 82, push rod 79 is provided with a yoked end 92 extending into housing 63 and freely received as best shown in FIGURES 7 and 8 in a sleeve 94 for a purpose as will become apparent. Sleeve 94 is fixedly secured to yoked end 92 by a pin 96 carried by yoked end 92 and extending between the legs thereof. A crank arm 98 of crank 99 extending between the legs of yoked end 92 is pivoted on pin 96 so that the crank arm 98 together with push rod 79 and sleeve 94 move as a unit. In order to permit pivotal displacement of crank arm 98 on pin 96, sleeve 94 is provided with a slot 100 which axially extends inwardly from its inner end as viewed from FIGURES 7 and 8.

A crank wheel 102 integral with crank arm 98 is rotatably mounted on a crank shaft 104 journalled for rotation at its opposite ends in sleeve bushings 106 and 108 which are press fitted into opposed coaxial inwardly extending apertured bosses 110 and 112 formed integral with housing 63 and cover plate 166 as best shown in FIGURE 3.

Figure 9:
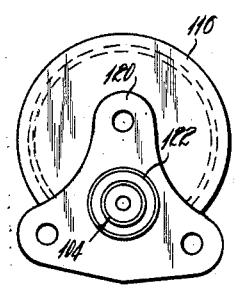
FIGURE 9 is an end elevation of the motor driven crank shaft for the electric gear shift mechanism illustrated in FIGURE 2.
Figure 10:
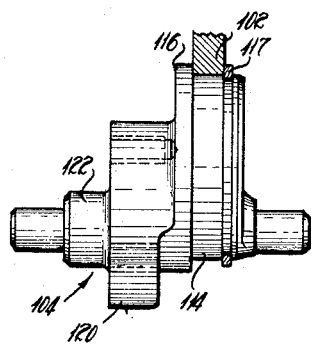
FIGURE 10 is a side elevation of the motor driven crank shaft illustrated in FIGURE 9.

Referring now to FIGURES 9 and 10, crank shaft 104 is formed with an eccentric crank section 114 rotatably mounting crank wheel 102 which is restrained from axial movement on crank section 114 between a radially extending annular shoulder 116 integral with crank shaft 104 and a retainer ring 117 seated in an annular groove formed in the crank section 114. In accordance with the present invention, crank wheel 102 is provided with an integral downwardly extending stop lug 118 adapted to engage a protruding stop 119 formed integral with housing 63 to limit rotation of crank shaft 104 to an angular distance of approximately 180° in either direction. In the position of crank wheel 102 as shown in FIGURE 2, crank shaft 104 with crank wheel 102 is rotated to its extreme clockwise position so that upon further clockwise movement of shaft 104, stop lug 118 will abut stop 119 and prevent further movement of crank shaft 104 in a clockwise direction. Adjacent to crank section 114, crankshaft 104 is integrally formed with a triangularly shaped flange section 120 and an enlarged shaft section 122.

Referring now to FIGURES 2-4, and 14 a gear 124 mounted on the shaft section 122 axially abuts flange section 120 and is fixedly secured thereto as by a plurality of screws 126 as best shown in FIGURE 3. Gear 124 is in constant mesh with a worm gear 126 non rotatably mounted on an intermediate section 128 of a drive shaft 130 extending transversely to the axis of crank shaft 104. Intermediate shaft section 128 is hexagonally shaped to permit axial movement of worm gear 126 but to prevent gear 126 from turning relative to shaft 130.

Shaft 130 is provided with reduced diameter cylindrical end sections 132 and 134 adjacent intermediate cylindrical sections 133 and 135 as best shown in FIGURE 14. Cylindrical end section 132 at the lower end of shaft 130 is received with a press fit in a downwardly depending shaft hub extension 136 which is journalled in a sleeve bearing 140 press fitted in a downwardly extending apertured boss 142 formed integral with housing 63 and is rotatably seated on a ball 144. Ball 144 is positioned in a recess formed in an axially adjustable tap screw 146 threadedly secured in apertured housing boss 142 so as to support ball 144. Tap screw 146 is secured in axially adjusted position in boss 142 by a nut 148. It will be appreciated that this construction provides for alignment and support of worm gear shaft 130.

Upper cylindrical end section 134 of shaft 130 extends through an opening 149 in housing 63 and is coaxially non-rotatably coupled to a motor shaft 150 of a conventional reversibly operable electric motor 152. Reversible motor 152 positioned over opening 149, is secured to housing 63 by means of a series of nut and bolt assemblies 154 as best seen in FIGURE 5 and is provided with a casing 156 having a downwardly projecting rim 158 overlapping the sides of an upwardly projecting shoulder 160 surrounding opening 149 and is separated therefrom by gasket 157 to prevent moisture and dirt from entering into housing 63.

Resilient one-piece rubber sleeves 162 and 164 are mounted on worm gear shaft 130 adjacent the upper and lower ends of worm gear 126 respectively as best shown in FIGURE 14. Resilient sleeve 162 is axially restrained between curved stop rings 166 and 168 slidably mounted on shaft 130 and axially abutting worm gear 126 and the end of motor shaft 150 respectively. The curvature of stop rings 166 and 168 serves to maintain sleeve 162 aligned on shaft 130. Resilient sleeve 164 is similarly axially restrained between a curved stop ring 170 axially abutting the lower end of worm gear 126 and a curved radially extending annular flange 172 formed integral at the end of shaft hub 136. Stop ring 170 is supported for axial movement on worm gear shaft 130 and the curvature of ring 170 and flange 172 serve to maintain sleeve 164 aligned on shaft 130.

By this structure, it will be appreciated that resilient sleeves 162 and 164 permit a cushioned and limited axial movement of worm gear 126 in either direction relative to worm gear shaft 130 and crankshaft gear 124 thereby preventing gear 124 from becoming lockingly engaged with worm gear 126. Thus, whenever a through-shift occurs in shifting clutch collar 52 into engagement with either of the ratio gears 40 or 42 with such a force to normally cause crankshaft gear 124 to jam with worm gear 126, the torque applied by motor 152 overcomes the resilient bias of either sleeve 162 or 164 to axially shift worm gear 126 in a direction for unlocking it from gear 124.

As shown in FIGURES 3 and 4, housing 63 is formed with an open side providing access to the component parts of the shift mechanism positioned therein and is enclosed by a cover plate 174 aligned by dowels 175 (FIGURE 4) and secured to housing as by screws 176 (FIGURE 3). In order to introduce oil into the housing 63, an oil plug 177 (FIGURE 3) is provided and is threadedly engaged in an aperture formed in cover plate 174.

In accordance with the present invention, reversible motor 152 is a direct-current series motor having separate field windings 180 and 182 wound in opposite directions to facilitate reversible rotation of motor shaft 150 as schematically shown in FIGURE 6. Supplying power to energize motor windings 180 and 182 is a vehicle electric power system including an electrical generating system (not shown) and a conventional storage battery 183 having a ground connection 184 at one battery terminal as shown in FIGURES 1 and 6.

With continued reference to FIGURES 1 and 6, a motor-energizing control circuit 186 is provided and includes a selector switch 188 and high and low speed knife-type switch blades 190 and 192 for interrupting current flow to motor windings 180 and 182 respectively.

As shown in FIGURE 1, selector switch 188 is conveniently secured to the vhicle transmission gear shift lever 194 for operation by the driver and has a selector lever 196 adapted to be connected to a movable switch blade 198 to move blade 198 into engagement with either terminal post 200 or terminal post 202. The positive terminal post 204 of battery 183 and the positive side of the vehicle electric power generating system is connected by conductors 206 and 208 to switch blade 198. Interposed in conductor 206 is an ignition switch 210 for controlling flow of current from battery 183 and the vehicle electric power generating system. Also interposed in conductor 206 is a circuit breaker 211 which serves to protect the system from damage if a short circuit develops.

Conductors 212 and 214 respectively connect selector switch terminals 200 and 202 with electrically insulated terminal posts of switch contacts 216 and 218 which are affixed to an electrical switch support and terminal plate 219 insulatedly mounted on the inside of housing cover 174 upon insulator block 220 adjacent to the bottom of housing 63 and fixedly secured to cover 174 as by screw 221 as best shown in FIGURES 3 and 5. Switch blades 190 and 192 are respectively rockably mounted about pivot terminals 222 and 224 (FIGURE 5) and are normally biased by springs 226, as shown in FIGURE 4, into engagement with their respective contacts 216 and 218. Switch blade pivot terminals 222 and 224 are respectively connected to motor windings 180 and 182 by conductors 228 and 230 as shown in FIGURES 5 and 6. Motor 152 is conveniently grounded as indicated at 232, FIGURE 6 to complete an electrical circuit therethrough.

Also in circuit 186 is a speedometer adaptor motor 234 adapted to compensate for the difference between the selected axle speed and the normal transmission speed and connected to selector terminal 200 by conductors 236 and 212.

Referring now to FIGURES 2–5, 7 and 8, an actuating device is provided for operating switch blades 190 and 192 and comprises a downwardly extending flat-sided plate 238 fixedly secured to sleeve 94 with one side thereof flush with the inner end of sleeve 94 as best shown in FIGURE 8. Secured adjacent the bottom edge of plate 238 by shouldered rivet assembly 240 is an insulating sleeve 242 which extends perpendicularly from the left side of plate 238 as viewed from FIGURE 7. Insulating sleeve 242 is positioned between inwardly extending tabs 244 and 246 formed integral with switch blades 190 and 192 and is movable with sleeve 94 and push rod 79 as a unit to engage either tab 244 or 246 and thereby rock either switch blade 190 or 192 out of engagement with its associated contact.

Prior to operation, oil plug 177 is removed and oil is introduced into the housing 63 to a level indicated at 248, FIGURE 5. At this oil level, the electrical contacting surfaces of switch blades 190 and 192 and contacts 216 and 218 are completely immersed in oil. Immersion of the contacting surfaces in oil prevents the surfaces from caking as a result of oil splashes and elevated temperatures and thereby eliminates circuit interruptions caused thereby. The oil surrounding the switch blades 190 and 192 serves to rapidly dissipate the heat and prevent the arcing produced by switching operations.

*Operation*

Referring now to FIGURES 2 and 11, clutch collar 52 and shift rail unit 68 are located in their extreme right hand positions. Shift rail unit 68 is retained in this position by abutting contact of sleeve 67 with clutch fork hub 73 and with the clutch teeth of collar 52 meshing with the teeth 54 of low speed gear 42. Detent 58 retains clutch collar 52 in a centered position relative to fork 70 so that there is no lateral wearing pressure on the latter or working load on spring 82 of the energy storage device. Switch blade 190 is disengaged from contact 216 by actuator 242 and switch blade 192 is biased by spring 226 into engagement with contact 218. The dotted position of crank 99 indicated at 250, FIGURE 11, corresponds to the position of the component parts shown in FIGURE 2.

When the driver desires to shift from gear 42 to gear 40, he moves the selector lever 196 of selector switch 188 to the position shown in FIGURES 1 and 6 wherein selector switch blade 198 engages terminal 202 and completes a circuit that may be traced from battery 183 or the positive side of the vehicle electric power generating system, through conductor 206 and closed ignition switch 210, through conductor 208, through switch blade 198 to terminal 202, through conductor 214 to contact 218, through switch blade 192 engaging contact 218 through conductor 230 and through winding 182 of motor 152 to ground to thereby energize motor 152 for counterclockwise rotation as viewed from FIGURE 3. Rotation of motor shaft 130 in a counterclockwise direction, rotates crank shaft 104 and crank 99 in a counterclockwise direction as viewed from FIGURES 11–13.

Movement of crank 99 from the position indicated at 250 to the position indicated at 252 as shown in FIGURE 11, axially moves push rod 79 to the left with the clutch collar 52 remaining locked with gear 42 and partly cocking spring 82 as long as driving torque is uninterrupted. Thus, shift rail 69 is retained in position by clutch collar 52 as the push rod 79 moves by crank 99 into the shift rail bore 78. Further movement of push rod 79 relative to shift rail 69 compresses spring 82 to the limit fixed by the spacing of stop collars 81 and 80. This preloaded condition of spring 82 is shown by the position of the crank 99 in full lines at 254 in FIGURE 12 wherein crank 99 has rotated counterclockwise through an angular distance of approximately 180°.

By now momentarily relieving pressure on the engine throttle control, the torque load on the gears is released, thus permitting the full force of the loaded spring 82 to be exerted and move shift rail 69 and clutch fork 70 together to the neutral position indicated in full lines as shown in FIGURE 12, thereby disengaging clutch collar 52 from clutch teeth 54 of gear 42. In this position, crank 99 is shown in FIGURES 12 and 13 to have rotated to its extreme counterclockwise position wherein the axis of push rod 79 substantially intersects the eccentric axis of crank arm 98 and crankwheel 102 in dead center as in the initial starting position. Further movement of the crank is restrained by stop lug 118 which is now positioned immediately adjacent to the left of stop 119.

Spring 82 acts independently of push rod 79 and motor 152 to urge shift rail 69 and clutch fork 70 to the left as viewed from FIGURES 12 and 13 and maintains a relatively light yielding pressure of the internal clutch teeth of collar 52 against the confronting ends of clutch teeth 56 on gear 40. Spring 82, in compressed condition, demeshes collar 52 from teeth 54 with high power and meshes collar 52 with teeth 56 with low power. As shown in FIGURES 12 and 13, spring 82 urges stop collar 80 abutting shoulder 83 on shift rail 69 to the left to move shift rail 69 therewith. Shifting of clutch fork 70 from its extreme right hand position as viewed from FIGURE 11 to its extreme left hand position as viewed from FIGURE 13 is thereby accomplished in one continuous movement. The collar 52 does not stop in the illustrated neutral condition of FIGURE 12, such being shown only to classify understanding of operation.

When the speed of gear 40 and clutch collar 52 are substantially synchronized, spring 82 then acts to further shift the collar to the left to mesh with clutch teeth 56 of gear 40 as shown in FIGURE 13. This meshing movement is limited by contact of retainer ring 84 on shift rail 69 with stop collar 81 axially biased toward the crank end by spring 82. Axial movement of stop collar 80 to the left by the bias of spring 82 is limited by contact of collar 80 with retainer ring 85 on push rod 79. The push rod 79, it will be noted, is axially restrained by the dead center positioning of crank 99.

Movement of clutch collar 52 to the left is then continued independently of fork 70 by the camming action of detents 58 against the inclined end face 61 of the coactive teeth on the clutch collar whereby the collar is properly centered with the sidewalls of groove 72 so that fork 71a is out of contact with the sides of groove 72 to avoid excessive wear of the fork and to relieve the working load on spring 82. Movement of crank 99 from the extreme right dead center position indicated at 250 to its extreme left dead center position, shifts switch actuator 242 from its extreme right-hand position to its extreme left-hand position to close switch blade 190 and open switch blade 192. Motor 152, however, does not reverse upon closing of switch blade 190 since selector switch 188 is not positioned to complete the circuit between conductor 208 and terminal 200. Thus, prior to the independent spring movement for shifting rail 69, the electrical current to motor 152 is interrupted and torque therefore ceases to be applied for rotating crank 99 beyond its extreme left dead center position indicated at 254, FIGURE 13. Switch 192 is held open by actuator 242 when shift unit 68 is positioned to engage clutch collar 52 and gear 40 so as to prevent motor 152 from being accidentally energized for further counterclockwise rotation. With spring 82 now fully compressed and the current to motor 152 interrupted by opening of switch blade 192, the torque load is released by relieving pressure on the engine throttle control as described above, thereby allowing the full force of the loaded spring 82 to be exerted to axially displace shift rail 69.

From the foregoing description, it will be appreciated that motor 152 completely compresses spring 82 prior to any shifting. When spring 82 is completely compressed the crank has traveled 180° and is in the position shown in FIGURE 12. At this position the switch 190 is opened and shuts off the motor. All energy for the actual shifting is then provided by the compressed spring 82.

Cooperation of stop lug 118 with stop 119 functions to prevent further counterclockwise movement of crank 99 that may be caused by the inertia developed in the moving parts of motor 152.

In shifting from high to low axle speed, the above operations are reversed. Selector switch 188 is moved to high speed position to transmit electrical current through the now closed switch 190 to energize winding 180 of motor 152. Motor shaft 150 now rotates in a clockwise direction as viewed from FIGURE 4 to rotate eccentric crank 99 in a similar direction from the position indicated at 254, FIGURE 13. Initially, push rod 79 is axially shifted to the right relative to shift rail 69 which is retained in position by the torque engagement of the teeth of clutch collar 52 with clutch teeth 56 of gear 40. Abutment of retainer ring 85 on push rod 79 with axially shiftable stop collar 80 axially moves stop collar 80 with the push rod so as to completely compress spring 82 between stop collars 80 and 81 in order to store energy for the shifting operation. Stop collar 81 is retained in position by abutment with retainer ring 84 on shift rail 69.

By now releasing torque load on the gears as by relieving pressure on the accelerator as before described, the full force of the spring 82 now acts independently of push rod 79 to urge shift rail 69 to its extreme right hand position for engagement with clutch teeth 54 of low ratio gear 42 as described above with respect to the engagement with high ratio gear 40.

In the extreme right-hand position as shown in FIGURES 2 and 11 and indicated at 250, eccentric crank 99 is in its extreme right-hand dead center position and further clockwise movement thereof is precluded by crank stop lug 118 and stop 119. Although the unit has been herein described and shown as attached to the side of a two speed rear axle carrier housing, the unit may also be mounted on the front of the carrier in cases where space does not permit a side mounting, without any considerable changes or modifications of the unit.

The simple and compact assembly herein disclosed provides for an accurately controlled two stage shifting movement in either direction by the incorporation of a reversible type electric actuating motor and a fast working switch assembly to interrupt electrical current after each preselected shift. A positive stop abutment means is provided to prevent the further movement of the power transmitting components after the electric motor is de-energized. The stop abutment means are positioned relative to the power transmitting components so as not to be damaged or misaligned. Cushioning means in form of rubber sleeves are incorporated into the power transmitting mechanism to prevent the mechanism from jamming when a "through-shift" occurs or when excessive strains are imparted to the components of the mechanism. The clutch collar is positively held in engagement in either high or low gear ratio engaging position after the electrical current to the operating motor is interrupted by centering the clutch collar relative to the clutch shift fork to relieve the shifter mechanism from the working load.

The invention may be embodied in other specific forms without departing from the spirit or essential characteristics thereof. The present embodiment is therefore to be considered in all respect as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an actuating mechanism for a shiftable coupling member, a movable shift member drivingly connected to said coupling member; a movable drive member; power storage means yieldably and drivingly interconnecting said shift and drive member to store energy during initial movement of said drive member and to subsequently release energy to accomplish a gear shifting movement of said shift member; a reversibly operable electric motor having a rotatable power output shaft; electrical selector circuit means for energizing said motor to selectively rotate said shaft in either direction and having a pair of spaced apart circuit energizing switches for establishing separate motor circuits to rotate said shaft in opposed directions; a switch actuator member rigid with said drive member for actuating said switches at predetermined positions of said drive member; and a power transmitting means drivingly interconnecting said motor shaft and said drive member comprising an eccentric crank rotatable between fixed limit positions in either direction corresponding to shift limit positions of said drive member.

2. The mechanism as defined in claim 1 wherein means are provided for pivotally mounting said switches, and wherein said switches are provided with surfaces positioned to cooperate with said actuator member, said actuator member being positioned between said cooperating surfaces of said switches to engage one or the other of said surfaces by movement of said drive member in either direction to thereby alternately rock said switches about their pivot to selectively interrupt the associated ones of said motor circuits, said switches being normally biased to circuit energizing positions.

3. In an actuating mechanism for a shiftable drive coupling member, an axially movable shift member drivingly connected to said coupling member; an axially movable drive member; power storage means yieldably and drivingly interconnecting said shift and drive members to store energy during initial movement of said drive member and to subsequently release energy to accomplish a gear shifting movement of said shift member; a reversible electric motor having a rotatable power output shaft; power transmitting means comprising an eccentric crank assembly drivingly interconnecting said shaft and one end of said drive member; a housing enclosing said power transmitting means and at least said one end of said drive member; electrical selector circuit means for energizing said motor to selectively rotate said shaft in either direction and having a pair of circuit energizing switches disposed in said housing for selectively establishing separate motor circuits to rotate said shaft in opposed direction; and a switch actuating member rigid with said one end of said drive member disposed in said housing and positioned to actuate either of said switches at predetermined positions of said drive member.

4. In an actuating mechanism for a shiftable coupling member, a movable shift member drivingly connected to said coupling member; an axially movable drive member; power storage means yieldably and drivingly interconnecting said shift and drive members to store energy during initial movement of said drive member and to subsequently release energy to accomplish a gear shifting movement of said shift member; a reversible electric motor having a rotatable output shaft; power transmitting means drivingly interconnecting said shaft and said drive member and comprising a rotatable member coupled to said shaft for rotation therewith, first gear means, means mounting said first gear means on said rotatable member and restraining said gear from rotation relative to said rotatable member but permitting limited resiliently cushioned axial movement of said gear means relative to said rotatable member, an eccentric crankshaft; a second gear means secured on said crankshaft and meshing with said first gear means, a crank arm member eccentrically mounted on said crankshaft and operatively coupling said crankshaft and said drive member; and a housing enclosing said power transmitting means and having surfaces cooperating with said crank arm member to prevent said crank arm member from rotating through an angular distance of more than 180° in either direction.

5. In an actuating mechanism for a shiftable drive coupling member, a movable shift member drivingly connected to said coupling member; an axially movable drive member; power storage means yieldably and drivingly interconnecting said shift and drive members to store energy during initial movement of said drive member and to subsequently release energy to accomplish a gear shifting movement of said shift member; a reversible electric motor having a rotatable output shaft; power transmitting means drivingly interconnecting said shaft and said drive member and comprising a rotatable member coaxially coupled to said shaft and having an intermediate portion defining flat surfaces, a worm gear slidably but non-rotatably mounted on said intermediate portion; resilient sleeve members mounted on said rotatable member adjacent the ends of said worm gear for permitting limited cushioned axial movement of said worm gear in either direction, a rotatable crankshaft extending transversely to said rotatable member, a gear non-rotatably mounted on said crankshaft and meshing with said worm gear, a crank arm member eccentrically mounted on said crankshaft, and means for coupling said crank arm member to said drive member so that the extreme axial positions of said drive member correspond substantially to opposed dead center positions of said crank arm member.

6. The mechanism as defined in claim 5 wherein means are provided to permit limited pivotal movement of the end of said rotatable member opposite from said shaft for aligning said rotatable member.

7. The mechanism as defined in claim 5 wherein a housing is provided enclosing said power transmitting means; a plug mounted in said housing and having an inwardly facing recess aligned with said motor shaft, a ball snugly positioned in said recess, and a sleeve member non-rotatably and coaxially secured to the end of said rotatable member opposite from said motor shaft and seated on said ball.

8. In an electric speed ratio shift mechanism, a reciprocably mounted shift rod assembly, means for reciprocating said rod between limit shift positions comprising a reversible electric motor, a shaft driven by said motor, a worm on said shaft, rotatably mounted eccentric crank means having a gear meshed with said worm and an operative connection to said rod assembly such that rotation of said crank means in either direction reciprocates said rod assembly, and means limiting rotation of said crank means to approximately 180° in either direction and so that when said crank means is in one or the other of its limit positions the rod assembly is correspondingly disposed in one of its limit shift positions.

9. In the electric shift mechanism defined in claim 8, a reversing switch for said motor and control means for said switch movable with said rod assembly and operable to actuate said switch means at each of said limit shift positions of the rod assembly.

10. In the electric shift mechanism defined in claim 8, said worm being rotatable with but axially slidable on said shaft, and opposed resilient cushion means at opposite ends of said worm.

11. In the electric shift mechanism defined in claim 8, a housing wherein said crank means is journalled about an axis disposed intersecting at right angles the axis of reciprocation of said rod assembly.

12. In the electric shift mechanism defined in claim 11, said shaft extending at right angles to the direction of said axis of reciprocation and to the axis of rotation of said crank means.

13. In an electric speed ratio shift mechanism, a reciprocable shift rod assembly comprising two longitudinally rigid telescoping coaxial rods connected by compression spring means, a change speed member connected to one of said rods and shiftable between drive torque transmitting engagement with two different ratio drive systems, an electric motor, means drive connecting said motor to said other rod and operable when a speed change is to be made and said member is in one of its torque transmitting positions to axially shift said other rod relative to said one rod to compress the spring, a reversing switch for said motor, and means rigid with said other rod for engaging directly and automatically reversing said switch when said other rod has been shifted a predetermined distance, said spring when drive torque in the associated system is released at said member expanding to shift said one rod and move said member into drive engagement with the other system.

14. In an electric speed ratio shift assembly, an electric motor, a shaft driven by said motor, a reciprocable shift rod assembly, an electrical circuit for said motor containing a reversing switch, means actuated by said shift rod assembly when it reaches opposite shift positions for operating said switch, a worm mounted to rotate with said shaft but having limited axial displacement relative to said shaft, a gear driven by said worm, opposed cushion means at opposite ends of said worm opposing said axial displacement from a predetermined position but permitting temporary slight axial displacement of said worm sufficient to prevent locking engagement of the worm and gear, and motion transmitting means comprising an eccentric crank connecting said gear to said rod assembly for translating rotation of said gear to reciprocation of said rod assembly.

15. In an electric speed ratio shift assembly, a reciprocable shift rod, a housing into which extends one end of said rod, an eccentric crank assembly journalled within said housing and connected to reciprocate said rod, an electric motor having a shaft extending into said housing to drive said crank assembly, means defining a control circuit for said motor, a switch in said circuit within said housing and a switch operator on said one end of the rod within the housing, said housing being sealed substantially oil tight and being substantially filled with oil so that said crank and switch operate in oil.

16. In an electric speed ratio change mechanism, a reciprocable shift rod assembly, an electric motor having a rotatable output shaft, an eccentric crank rotatably driven by said shaft and operably connected to reciprocate said rod assembly, means limiting movement of said crank to substantially 180° in either direction to dispose said rod assembly in opposite shift limit positions, and a control switch for said motor actuated by said rod assembly.

17. In an actuating mechanism for a shiftable gear ratio assembly, a reciprocable drive coupling element, a movably mounted shift member operatively connected to said coupling element, a movably mounted longitudinally rigid drive member, spring means yieldably interposed between said drive member and said shift member to permit relative movement of said members to store energy in said spring means during initial movement of said drive member in a given direction and to subsequently release said energy to displace said shift member in the same direction to accomplish shifting movement of said coupling element, a reversible electric motor having an energizing circuit and a rotatable output shaft, a motor control switch in said circuit having movable elements adjacent said drive member, power transmitting means drivingly interconnecting said motor output shaft and said drive member, and an actuating member rigid with and projecting from said drive member to engage and move one or the other of said switch elements in opposite shift positions of said drive member.

18. In an actuating mechanism for a shiftable gear ratio assembly, a reciprocable drive coupling element, a movably mounted shift member operatively connected to said coupling element, a movably mounted drive member, spring means yieldably interposed between said drive member and said shift member to permit relative movement of said members to store energy in said spring means during initial movement of said drive member in a given direction and to subsequently release said energy to displace said shift member in the same direction to accomplish shifting movement of said coupling element, a reversible electric motor having an energizing circuit and a rotatable output shaft, a motor control switch in said circuit, power transmitting means drivingly interconnecting said motor output shaft and said drive member comprising an eccentric assembly driven by said output shaft and pivotally connected to one end of said drive member, and means on said drive member operably connected to actuate said switch.

19. In an electric speed ratio shift assembly, a reciprocable shift rod, a housing into which extends one end of said rod, said housing having an opening, a cover secured over said opening, an eccentric crank assembly journalled within said housing and connected to reciprocate said rod, an electric motor having a circuit and a shaft extending into said housing to drive said crank assembly, a switch in said circuit located within said housing and mounted on said cover and a switch operator on said one end of the rod within the housing, said housing being sealed substantially oil tight when said cover is secured thereon and being substantially filled with oil so that said crank and switch operate in oil.

20. In an electric speed ratio shift assembly, a reciprocable shift rod, a housing into which extends one end of said rod, an eccentric crank assembly journalled within said housing and connected to reciprocate said rod, internal surfaces in said housing cooperating with said crank assembly to prevent movement thereof beyond an angular distance of 180° in either direction, said crank assembly being operable to limit movement of said shift rod to corresponding linear distances thereby preventing said shift rod from overtraveling gear engaging positions of a drive coupling connected thereto, an electric motor having a shaft extending into said housing to drive said crank assembly, a switch within said housing and a switch operator on said one end of the rod within the housing, said housing being sealed substantially oil tight and being substantially filled with oil so that said crank and switch operate in oil.

21. In an electric speed ratio shift mechanism, a reciprocable shift rod assembly comprising telescoping coaxial rods connected by compression spring means, a change speed member connected to one of said rods and shiftable between drive torque transmitting engagement with two different ratio drive systems, an electric motor, means drive connecting said motor to said other rod and operable when a speed change is to be made and said member is in one of its torque transmitting positions to axially shift said other rod relative to said one rod to compress the spring, a reversing switch for said motor, and means rigid with said other rod for automatically reversing said switch when said other rod has been shifted a predetermined distance, said spring when drive torque in the associated system is released at said member expanding to shift said one rod and move said member into drive engagement with the other system, and said motor having a circuit including said reversing switch and a speed ratio selector switch, said selector switch being operable to establish a first circuit portion energized to cause rotation of said motor in one direction, said first circuit portion being closed through one side of said reversing switch, and said reversing switch acting when reversed by movement of said other rod to open said first circuit portion and close a second circuit portion which is open at said selector switch, and said selector switch being further operable to close said second circuit portion to cause opposite rotation of the motor.

22. In an electric speed ratio shift assembly, a linearly reciprocable shift rod, a housing into which extends one end of said rod, an eccentric crank assembly journalled within said housing and connected to reciprocate said rod, an electric motor having a circuit and a shaft extending into said housing to drive said crank assembly, a switch in said circuit mounted within said housing and a switch operator on said one end of the rod within the housing, and stop means within said housing operable to limit angular movement of said crank assembly to substantially 180° in either direction, said crank assembly being operable to limit linear movement of said shift rod to corresponding linear distances during gear changing movement.

23. In the electric speed ratio shift assembly defined in claim 22, said rod being pivotally connected to said crank assembly on an axis that is parallel to the axis of rotation of said crank assembly, and said axes lying in a line substantially parallel to the path of reciprocation of said shift rod in opposite limit positions of movement of said shift rod.

24. In an actuating mechanism for a shiftable drive coupling member, an axially movable shift member drivingly connected to said coupling member; an axially movable drive member; power storage means yieldably and drivingly interconnecting said shift and drive members to store energy during initial movement of said drive member and to subsequently release energy to accomplish a gear shifting movement of said shift member; a reversible electric motor having a rotatable power output shaft; power transmitting means drivingly interconnecting said shaft and said drive member; a housing enclosing said power transmitting means and at least one end of said drive member; electrical selector circuit means for energizing said motor to selectively rotate said shaft in either direction and having a pair of circuit energizing switches for selectively establishing separate motor circuits to rotate said shaft in opposed directions; means mounting said switches in an oil immersion space within said housing; and a switch actuating member rigid with the end of said drive member disposed in said housing and positioned to actuate either of said switches at predetermined positions of said drive member.

References Cited in the file of this patent
UNITED STATES PATENTS

| | | |
|---|---|---|
| 2,317,490 | Simpson | Apr. 27, 1943 |
| 2,462,779 | Russel | Feb. 22, 1949 |
| 2,589,643 | Thomas et al. | Mar. 18, 1952 |
| 2,634,622 | Cripe | Apr. 14, 1953 |
| 2,649,813 | Barth et al. | Aug. 25, 1953 |
| 2,654,326 | Sheen et al. | Oct. 6, 1953 |